United States Patent [19]

Ishikawa

[11] Patent Number: 5,390,123
[45] Date of Patent: Feb. 14, 1995

[54] NAVIGATION SYSTEM WITH ACCURATE DETERMINATION OF ANGULAR VELOCITY

[75] Inventor: Masataka Ishikawa, San Jose, Calif.

[73] Assignee: Zexel Corporation Daihatsu-Nissay, Tokyo, Japan

[21] Appl. No.: 896,145

[22] Filed: Jun. 9, 1992

[51] Int. Cl.$^6$ .................................................. G01C 17/38
[52] U.S. Cl. ........................................ 364/449; 364/443
[58] Field of Search .................................. 364/443, 449

[56] References Cited

U.S. PATENT DOCUMENTS 4,558,418 12/1985 Kearns ............................ 364/450
5,023,799 6/1991 Nakayama et al. ............. 364/449
5,172,322 12/1992 Takano et al. ................... 364/449

FOREIGN PATENT DOCUMENTS 62-61275 12/1987 Japan .

Primary Examiner—Kevin J. Teska
Assistant Examiner—Susan Wieland
Attorney, Agent, or Firm—Morrison Law Firm; Harold L. Burstyn; Thomas R. Morrison

[57] ABSTRACT

A navigation system having two sensors and two circuits. A travel sensor sends a pulse whenever a vehicle travels a predetermined distance. An angular velocity sensor outputs a voltage corresponding to an angular velocity of the vehicle. A correction circuit calculates the angular velocity from both a reference voltage that corresponds to an angular velocity of zero and an output voltage from the angular velocity sensor. A reference voltage resetting circuit monitors the pulse from the travel sensor; sets, as an effective sampling interval, at least a part of a interval from the end of a predetermined first cancellation interval after the pulse stops until the start of a second cancellation interval prior to a resumption of the pulse; calculates an average value of the output voltage of the angular velocity sensor, which has been periodically sampled during the effective sampling interval; and resets the reference voltage to the average value.

16 Claims, 6 Drawing Sheets

NAVIGATION SYSTEM WITH ACCURATE DETERMINATION OF ANGULAR VELOCITY

BACKGROUND OF THE INVENTION

This invention relates to a navigation system to be mounted on a vehicle.

Japanese Patent Publication No. 61275/87 discloses a navigation system comprising a microcomputer, an angular velocity sensor, and a travel sensor. The angular velocity sensor outputs a voltage that corresponds to an angular velocity of a vehicle generated when the vehicle changes its direction. The output voltage from the angular velocity sensor is converted to a digital signal by an analog-to-digital converter. The travel sensor sends a pulse every time the vehicle travels a predetermined distance. The microcomputer receives the digital angular velocity; calculates, from the pulses coming from the travel sensor, the distance the vehicle has travelled; and then computes a current position of the vehicle from the angular velocity and distance travelled.

Even if the angular velocity of the vehicle is constant, the output of the angular velocity sensor varies slightly with temperature and other conditions. Thus the navigation system disclosed in the above publication requires a correction circuit. This correction circuit takes the output voltage of the angular velocity sensor when the vehicle is stopped as a reference voltage for zero angular velocity. And the correction circuit uses the reference voltage to correct the output of the analog-to-digital converter to a presumptively accurate angular velocity. The correction circuit works by monitoring the pulse from the travel sensor and resetting the reference voltage after a predetermined interval of no pulse. This procedure of resetting the reference voltage continues until immediately before the pulse from the travel sensor resumes.

However, the navigation system disclosed above has disadvantages. When the vehicle is moving slowly, the travel sensor may send a pulse later than when the vehicle actually starts to move. If the vehicle changes direction as it starts to move, before the pulse is sent, the correction circuit takes the output voltage of the angular sensor as the no-motion voltage and resets the reference voltage, even though the angular velocity of the vehicle is not zero. Because the correction circuit has reset the reference voltage to the output voltage when the angular velocity is not zero, it becomes practically impossible to determine the angular velocity accurately thereafter. Moreover, the reference voltage, reset to the output voltage from the angular velocity sensor immediately before the pulse is sent, may not be reliable, because a number of factors can cause the output voltage from the angular velocity sensor to vary.

OBJECTS AND SUMMARY OF THE INVENTION

An object of the present invention is to provide a navigation system in which the angular velocity can be accurately determined.

A further object of the present invention is to determine the angular velocity with great accuracy by obtaining a reference voltage that corresponds to an angular velocity of zero.

Still a further object of the present invention is to provide a navigation system that overcomes the drawbacks of the prior art.

Briefly stated, the present invention provides a navigation system having two sensors and two circuits. A travel sensor sends a pulse whenever a vehicle travels a predetermined distance. An angular velocity sensor outputs a voltage corresponding to an angular velocity of the vehicle. A correction circuit calculates the angular velocity from both a reference voltage that corresponds to an angular velocity of zero and an output voltage from the angular velocity sensor. A reference voltage resetting circuit monitors the pulse from the travel sensor; sets, as an effective sampling interval, at least a part of a interval from the end of a predetermined first cancellation interval after the pulse stops until the start of a second cancellation interval prior to a resumption of the pulse; calculates an average value of the output voltage of the angular velocity sensor, which has been periodically sampled during the effective sampling interval; and resets the reference voltage to the average value.

According to an embodiment of the invention, a navigation system comprises: a travel sensor for communicating a pulse whenever a vehicle runs a predetermined distance; an angular velocity sensor for communicating a voltage corresponding to an angular velocity of said vehicle, means for calculating said angular velocity from both a reference voltage that corresponds to the angular velocity of zero and an output voltage from said angular velocity sensor, means for resetting said reference voltage, said means for resetting responding to said pulse from said travel sensor, said means for resetting employing, as an effective sampling interval, at least a part of an interval from an end of a predetermined first cancellation interval after said pulse has stopped until a start of a second cancellation interval prior to a resumption of said pulse, said means for resetting calculating an average value of said output voltage from samples taken periodically during said effective sampling interval, and said means for resetting resetting said reference voltage so that a reset reference voltage is equal to said average value.

According to a feature of the invention, a navigation system, which comprises: a travel sensor for communicating a pulse whenever a vehicle runs a predetermined distance; an angular velocity sensor for communicating a voltage corresponding to an angular velocity of the vehicle; a correction circuit for calculating the angular velocity from both a reference voltage that corresponds to the angular velocity of zero and an output voltage from the angular velocity sensor; a reference voltage resetting circuit for resetting said reference voltage; the reference voltage resetting circuit responding to the pulse from the travel sensor; the reference voltage resetting circuit employing, as an effective sampling interval, at least a part of an interval from an end of a predetermined first cancellation interval after the pulse has stopped until a start of a second cancellation interval prior to a resumption of the pulse; the reference voltage resetting circuit calculating an average value of the output voltage from a plurality of samples thereof taken periodically during the effective sampling interval; and the reference voltage resetting circuit setting the reference voltage so that a reset reference voltage is equal to the average value.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENT

Figure 1:
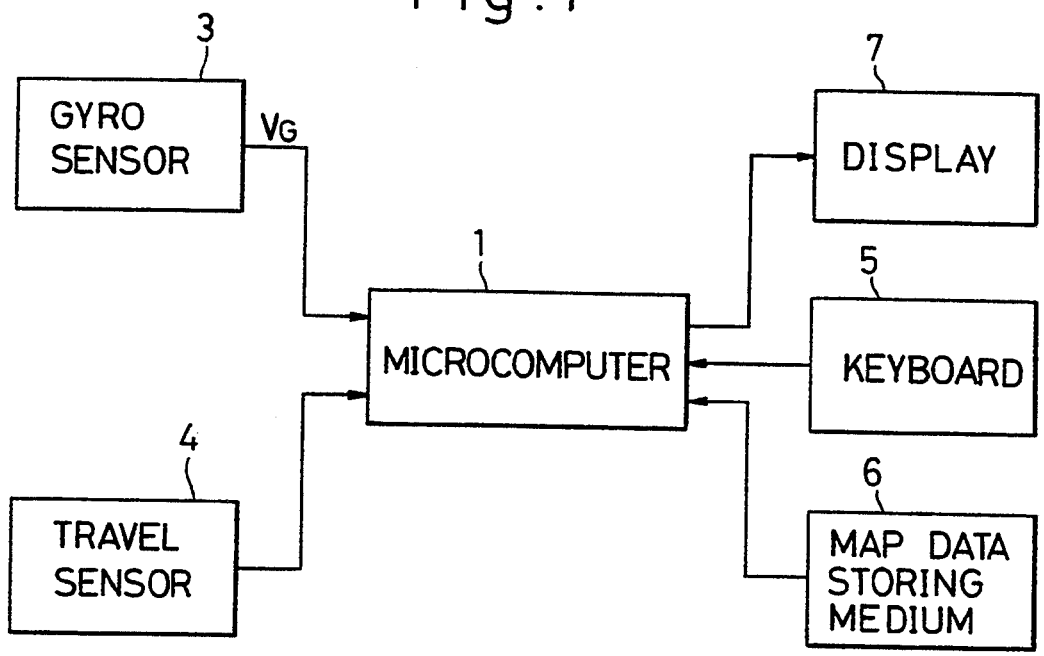
FIG. 1 is a block diagram schematically showing construction of a navigation system of the present invention.

Referring to FIG. 1, in one embodiment of the present invention a vehicle navigation system is provided with a microcomputer 1. An output voltage $V_G$ from a gyro sensor 3, which senses an angular velocity, is entered into microcomputer 1 through an analog-to-digital converter (not shown) built into microcomputer 1. Gyro sensor 3 outputs a voltage corresponding to an angular velocity generated when the vehicle changes direction. Pulses from a travel sensor 4 are also entered into microcomputer 1.

Travel sensor 4 is mounted on, for example, an output shaft of a vehicle's transmission. Its output pulses are proportional to the rotation of the output shaft. In other words, travel sensor 4 sends a pulse when the vehicle has traveled a predetermined distance. Destination data from a keyboard 5 are entered into microcomputer 1. And map data from a map data storage medium 6, comprising a magnetic disc or the like, are also entered into microcomputer 1 through a reader (not shown).

Microcomputer 1 obtains the angular velocity generated when the vehicle makes a change of direction from the output voltages of gyro sensor 3 and the distance traveled from the pulses of travel sensor 4. Microcomputer 1 also computes the vehicle's current position from the angular velocity and the distance traveled and controls a display 7, which displays route guidance information based on this current position and the aforementioned destination and map data.

Figure 2:
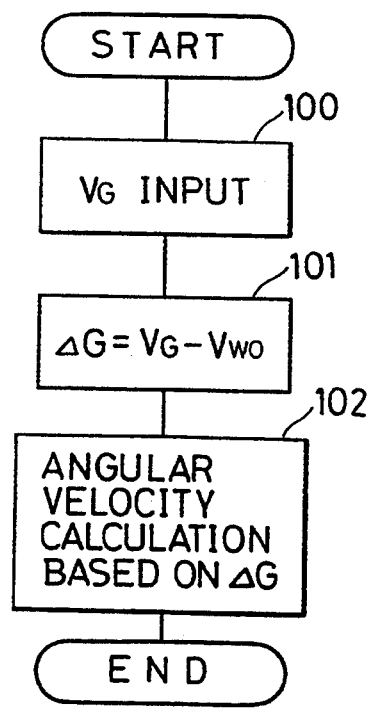
FIG. 2 is a flow chart of a program, to be executed by the microcomputer of FIG. 1, that calculates an angular velocity.

Referring to FIG. 2, microcomputer 1 periodically calculates the angular velocity of the vehicle by a timer-driven interrupt program. First, an output voltage $Y_G$ from gyro sensor 3 is entered into microcomputer 1 (Step 100). Then microcomputer 1 calculates a difference $\Delta G$ between output voltage $V_G$ and a reference voltage $V_{WO}$. Reference voltage $V_{WO}$ is the output voltage from gyro sensor 3 when the angular velocity is zero (Step 101). Then microcomputer 1 calculates the angular velocity from $\Delta G$ (Step 102).

The output voltage from gyro sensor 3 is varied slightly by conditions other than angular velocity (e.g., temperature, etc.). Therefore it is necessary to reset reference voltage $V_{WO}$, in accordance with variations in output voltage, to calculate the angular velocity accurately in the above routine by maintaining the constant relation between $\Delta G$ and the angular velocity.

Figure 3:
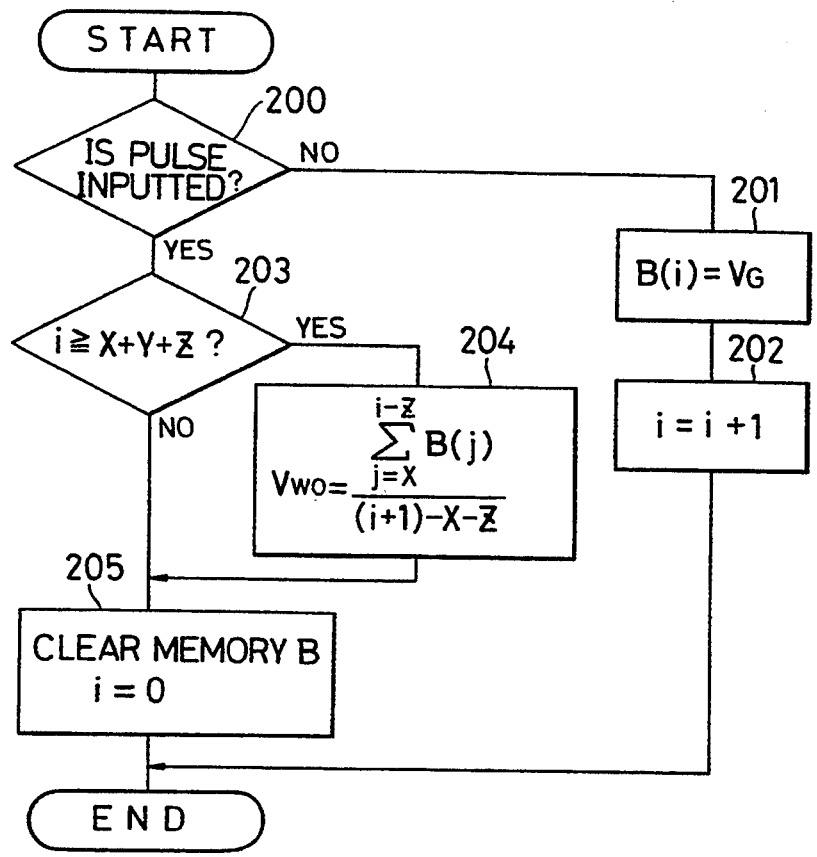
FIG. 3 is a flow chart of a program, to be executed by the microcomputer, that resets the reference voltage.

Referring to FIG. 3, microcomputer 1 resets reference voltage $V_{WO}$ at an interval T (for example, 20 msec) by way of the timer-driven interrupt program shown. More specifically, first, it is decided whether or not pulses from travel sensor 4 have been entered into microcomputer 1 during a previous interval (Step 200). If the result of Step 200 is "NO", the output voltage $V_G$ from gyro sensor 3 is written into a designated address i of a buffer memory B (Step 201). This procedure corresponds to sampling the output voltage $V_G$. Subsequently, designated address i is incremented to designate a new address for output voltage $V_G$ in the next iteration (Step 202).

If the result of Step 200 is "YES", sampling of output voltage $V_G$ is stopped, and the program proceeds to Step 203. In this way, output voltage $V_G$ is sampled in an interval T during a time i*T (see FIG. 4), from immediately after the pulse from travel sensor 4 stops until it resumes. The values of output voltage $V_G$ are written sequentially into addresses 0 to 1 of buffer memory B.

Figure 4:
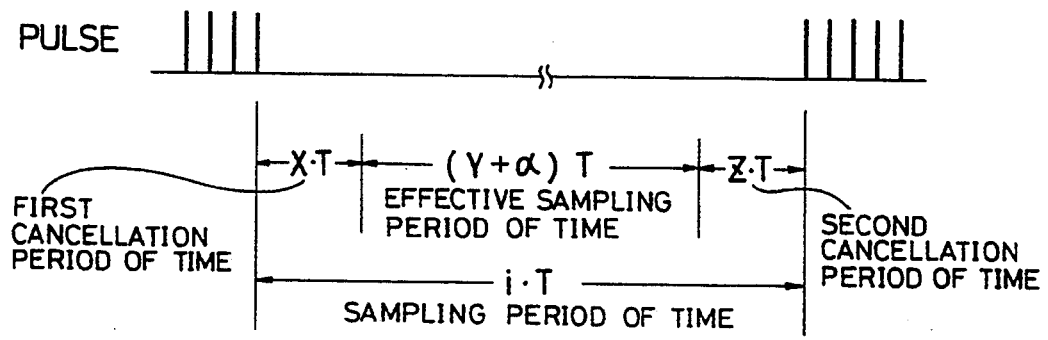
FIG. 4 is a time chart that shows a sampling of output voltages from an angular velocity sensor in the program of FIG. 3.

Before Step 203 is described, a first cancellation interval and a second cancellation interval will be described with reference to FIG. 4. These first and second cancellation intervals are set, taking account of the fact that the absence of a pulse from travel sensor 4 does not necessarily mean the vehicle has come to a complete stop. The first cancellation interval is a predetermined interval after the pulses from travel sensor 4 stop. The second cancellation interval is a predetermined interval preceding the resumption of the pulses from travel sensor 4. Microcomputer 1 recognizes a portion of an interval i*T (see FIG. 4), during which travel sensor 4 sends no pulses, to be an interval during which the vehicle is completely stopped. This portion is calculated by excluding (that is, subtracting) both the first and second cancellation intervals from the interval i*T. In this embodiment, the interval i*T, during which no pulses are sent by travel sensor 4, becomes an actual sampling interval, and the interval during which the vehicle is completely stopped becomes an effective sampling interval. The first cancellation interval is X*T, where X is an integer. If X is replaced by, for example, 100, X*T becomes two seconds. The second cancellation interval is Z*T, where Z is an integer. If Z is replaced by, for example, 50, Z*T becomes 1 second.

A predetermined interval Y*T is the time required to obtain an accurate average value of output voltage $V_G$, where Y is an integer. If Y is replaced by, for example, 256, the predetermined interval Y*T becomes 5.12 seconds.

In Step 203, it is decided whether or not the designated address i is equal to or more than X+Y+Z. In other words, the following equation is evaluated:

$$i^*T \geq X^*T + Y^*T + Z^*T$$

Specifically, is the interval i*T, during which the pulse from travel sensor 4 is stopped, equal to or greater than the sum of the first cancellation interval X*T, the second cancellation interval Z*T, and the predetermined interval Y*T? In other words, is an interval from the end of the first cancellation interval X*T until the start of the second cancellation interval Z*T equal to or longer than the predetermined interval Y*T?

If the result of Step 203 is "YES", the program proceeds to Step 204 to reset reference voltage $V_{WO}$. Then buffer memory B is cleared, designated address i is reset to zero (Step 205), and the program ends.

The resetting of reference voltage $V_{WO}$ effected in Step 204 will be described in detail. As previously mentioned, the whole interval obtained by subtracting the first cancellation interval X*T and the second cancellation interval Z*T from the interval i*T, during which travel sensor 4 emits no pulse, is the effective sampling interval. This effective sampling interval is equal to the predetermined interval Y*T, or it is longer, i.e., (Y+α)T. The samples of output voltage $V_G$ obtained during this effective sampling interval, i.e., the values of output voltage $V_G$ stored in addresses X to i-X of buffer memory B, are added together and the sum divided by (i+1)−X−Z to obtain the average value of output voltage $V_G$. Then the reference voltage $V_{WO}$ is reset to the average value. The values of output voltage $V_G$ from gyro sensor 3 sampled during the first and second cancellation intervals X*T and Z*T are not used for resetting the reference voltage $V_{WO}$.

Choosing a first cancellation interval X*T gives an advantage. When hard braking stops a moving vehicle abruptly, as in a panic stop, the vehicle body sways, generating an angular velocity. In response, gyro sensor 3 generates an output voltage $V_G$ that is not the same as when the angular velocity is zero. The first cancellation interval X*T (two seconds) is longer than the time from when the pulses from travel sensor 4, caused by the hard braking, stop until the swaying of the body stops. Therefore output voltage $V_G$, which does not correspond to zero angular velocity, can be used to reset the reference voltage $V_{WO}$ without compromising the latter's accuracy.

Choosing a second cancellation interval Z*T also gives an advantage. When the vehicle begins to move slowly, travel sensor 4 sends a pulse after the vehicle has actually started to move. If the vehicle changes direction in the short interval from its actual start until the first pulse from travel sensor 4, the angular velocity is not zero. Gyro sensor 3 generates an output voltage $V_G$ that is not the same as when the angular velocity is zero. Since the vehicle is moving at low speed, the second cancellation interval Z*T (one second) is longer than the interval from the actual start of the vehicle until the first pulse. Therefore reference voltage $V_{WO}$ will not be reset to an output voltage $V_G$ that does not correspond to zero angular velocity, and the accuracy of reference voltage $V_{WO}$ will be maintained.

Moreover, in the system of the present invention, reference voltage $V_{WO}$ is highly reliable, because it is reset to the average value of the output voltage $V_G$, which has been sampled many times (256 or more) during the interval equal to or longer than the predetermined interval Y*T. Because the system of the present invention calculates a highly reliable reference voltage $V_G$, the angular velocity can also be calculated accurately, thus enabling accurate navigation.

If the result of Step 203 is "NO", in other words, if the number of samples from which to calculate the average value of output voltage $V_G$ cannot be obtained, Step 204 is skipped in order not to reset the reference voltage $V_{WO}$ to an inaccurate value. Step 205 is executed, and the program ends.

Figure 5:
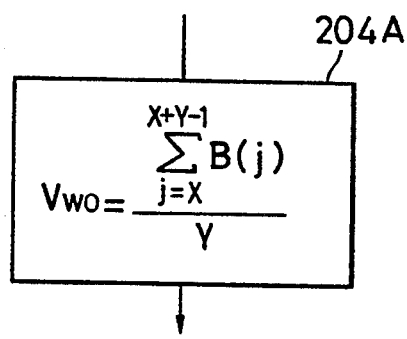
FIG. 5 shows one step that can replay a selected step in the program of FIG. 3.
Figure 6:
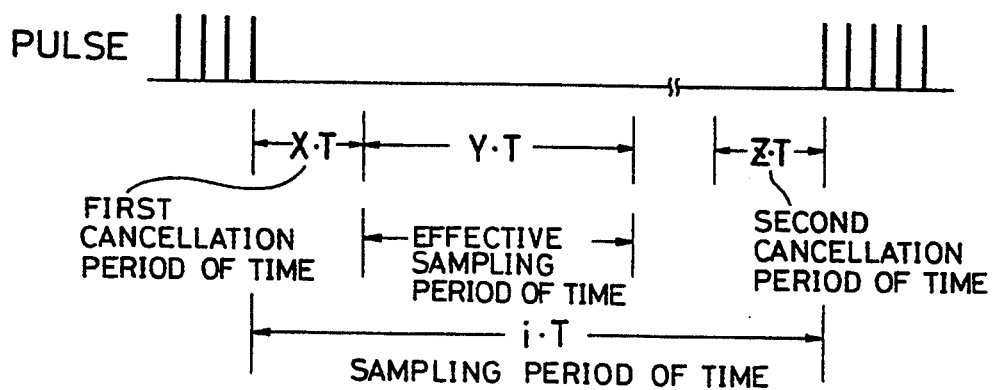
FIG. 6 is a time chart that shows a sampling when the step of FIG. 5 is used.

Other embodiments of the present invention will be described next. Referring to FIG. 6, the predetermined interval Y*T that follows the first cancellation interval X*T may be set as the effective sampling interval by executing Step 204A in FIG. 5 instead of Step 204 of FIG. 3. The samples of output voltage $V_G$ obtained during this effective sampling interval, i.e., values of output voltage $V_G$ stored in addresses X to X+Y−I of buffer memory B, are added together, and the sum is divided by Y to obtain the average output voltage $V_G$. Then the reference voltage $V_{WO}$ is reset to the average value. In this embodiment, the reference voltage $V_{WO}$ can be reset based on the minimum number of samples.

Figure 7:
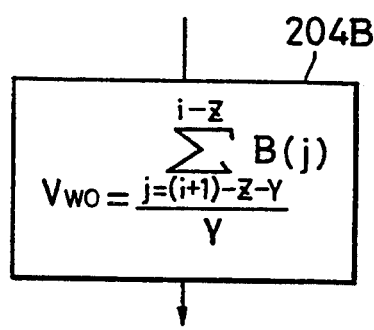
FIG. 7 shows one step that can replace a selected step in the program of FIG. 3.
Figure 8:
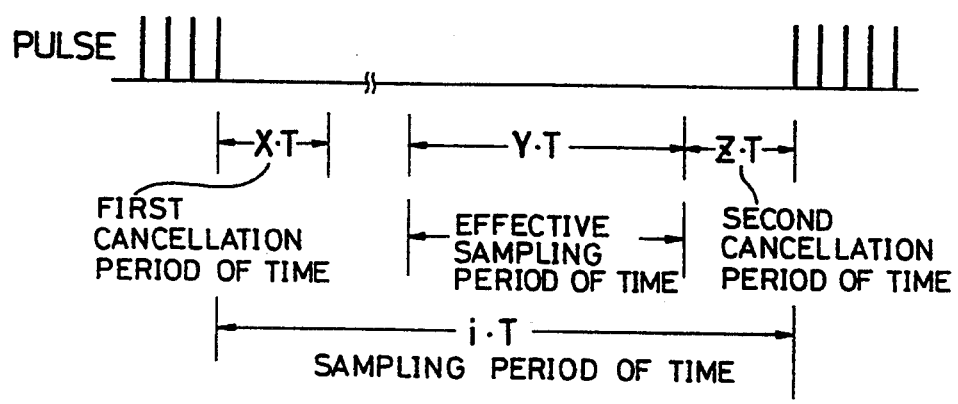
FIG. 8 is a time chart that shows a sampling when the step of FIG. 7 is used.

Alternatively, as shown in FIG. 8, the predetermined interval Y*T preceding the second cancellation interval Z*T may be set as the effective sampling interval by executing Step 204B of FIG. 7 instead of Step 204 of FIG. 3. The samples of output voltage $V_G$ which have been obtained during this effective sampling interval, i.e., the values of output voltage $V_G$ stored in addresses (i+1)-Z-Y to i-Z of buffer memory B, are added together, and the sum is divided by Y to obtain the average of the output voltage $V_G$. Then reference voltage $V_{WO}$ is reset to the average value. This embodiment is particularly effective when the stopping interval of the vehicle is long and temperature variation is significant. The reason is that reference voltage $V_{WO}$ can be reset from values of output voltage $V_G$ generated during a interval that is close to when the vehicle starts.

Figure 9:
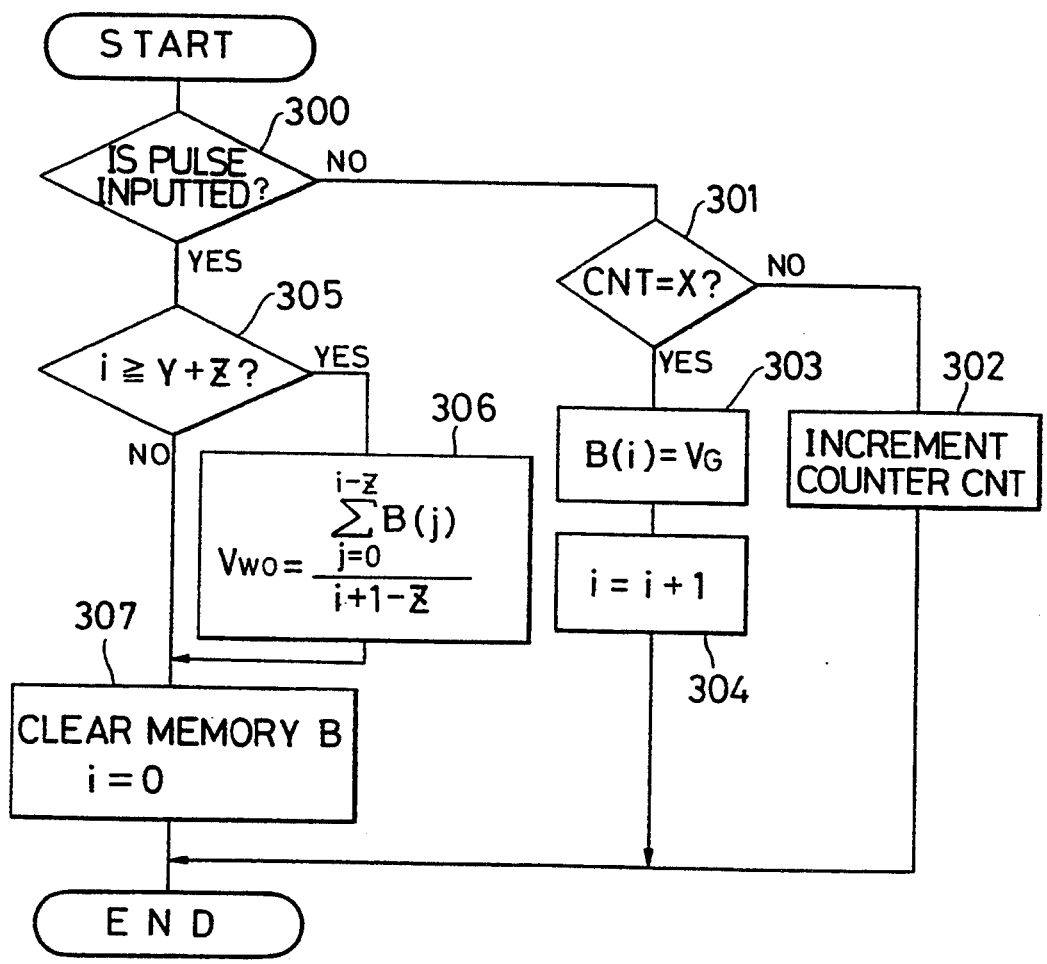
FIGS. 9 and 10 show additional examples of the flow chart of a reference voltage resetting program.

FIG. 9 shows another example of the program for resetting the reference voltage. In this example, unnecessary sampling of output voltage $V_G$ during the first cancellation interval X*T can be avoided. First, it is decided whether or not the pulse from travel sensor 4 has been entered into microcomputer 1 (Step 300). If the result is "NO", it is decided whether or not a counter CNT has reached X (Step 301). If the result of Step 301 is "NO", counter CNT is incremented (Step 302), and the program ends. Steps 300, 301, and 302 are executed repeatedly during first cancellation interval X*T after the pulse from travel sensor 4 stops. Immediately after the end of first cancellation interval X*T, the result of Step 301 is "YES", and Steps 303 and 304 are executed. In Step 303 output voltage $V_G$ is sampled and written into address i of buffer memory B, as in Step 201 of the program in FIG. 3. In Step 304 the address where the output voltage $V_G$ is to be written next is designated, as in Step 202 of the program in FIG. 3. The sampling of output voltage $V_G$ is repeated until the pulse from travel sensor 4 resumes.

Immediately after the pulse resumes, the result of Step 300 becomes "YES", and the program proceeds to Step 305. In Step 305 it is decided whether or not i is equal to or greater than Y+Z. More specifically, it is decided whether or not the interval from the end of the first cancellation interval X*T until the pulse from travel sensor 4 resumes is equal to or greater than the sum of the predetermined interval Y*T and the second cancellation interval Z*T, in other words, whether or not the interval from the end of the first cancellation interval X*T until the start of the second cancellation interval Z*T is equal to or greater than the predetermined interval Y*T.

If the result of Step 305 is "YES", the program proceeds to Step 306, where the reference voltage $V_{WO}$ is reset. Then buffer memory B is cleared, the address i is reset to zero (Step 307), and the program ends. If the result of Step 305 is "NO", Step 306 is skipped, Step 307 is executed, and the program ends.

The procedure of Step 306 for resetting reference voltage $V_{WO}$ will now be described in detail. Here the whole interval from the end of first cancellation interval X*T until the start of second cancellation interval Z*T is set as the effective sampling interval. This effective sampling interval is equal to or longer than the predetermined interval Y*T. The samples of output voltage $V_G$ obtained during this effective sampling interval, i.e., the values of output voltage $V_G$ stored in addresses 0 to i-Z of buffer memory B, are added, and the sum is divided by i+1-Z to obtain the average value of the output voltage $V_G$. Then the reference voltage $V_{WO}$ is reset to this average value.

The reference voltage $V_{WO}$ may also be reset by setting the predetermined interval Y*T as the effective sampling interval after the end of the first cancellation interval X*T instead of executing Step. 306 of FIG. 9. More specifically, the values of output voltage $V_G$ obtained during this effective sampling interval, i.e., the values of output voltage $V_G$ stored in addresses 0 to Y-1 of buffer memory B, are added together, and the sum is divided by Y to obtain the average value of the output voltage $V_G$. Then the reference voltage $V_{WO}$ is reset to that value.

The reference voltage $V_{WO}$ may also be reset by setting the predetermined interval Y*T as the effective sampling interval preceding the second cancellation interval Z*T instead of executing Step 306 of FIG. 9. More specifically, the samples of output voltage $V_G$ obtained during this effective sampling interval, i.e., the values of output voltages $V_G$ stored in addresses (i+1)-Z-Y to i-Z of buffer memory B, are added together, and the sum is divided by Y to obtain the average value of the output voltage $V_G$. Then the reference voltage $V_{WO}$ is reset to that value.

Figure 10:
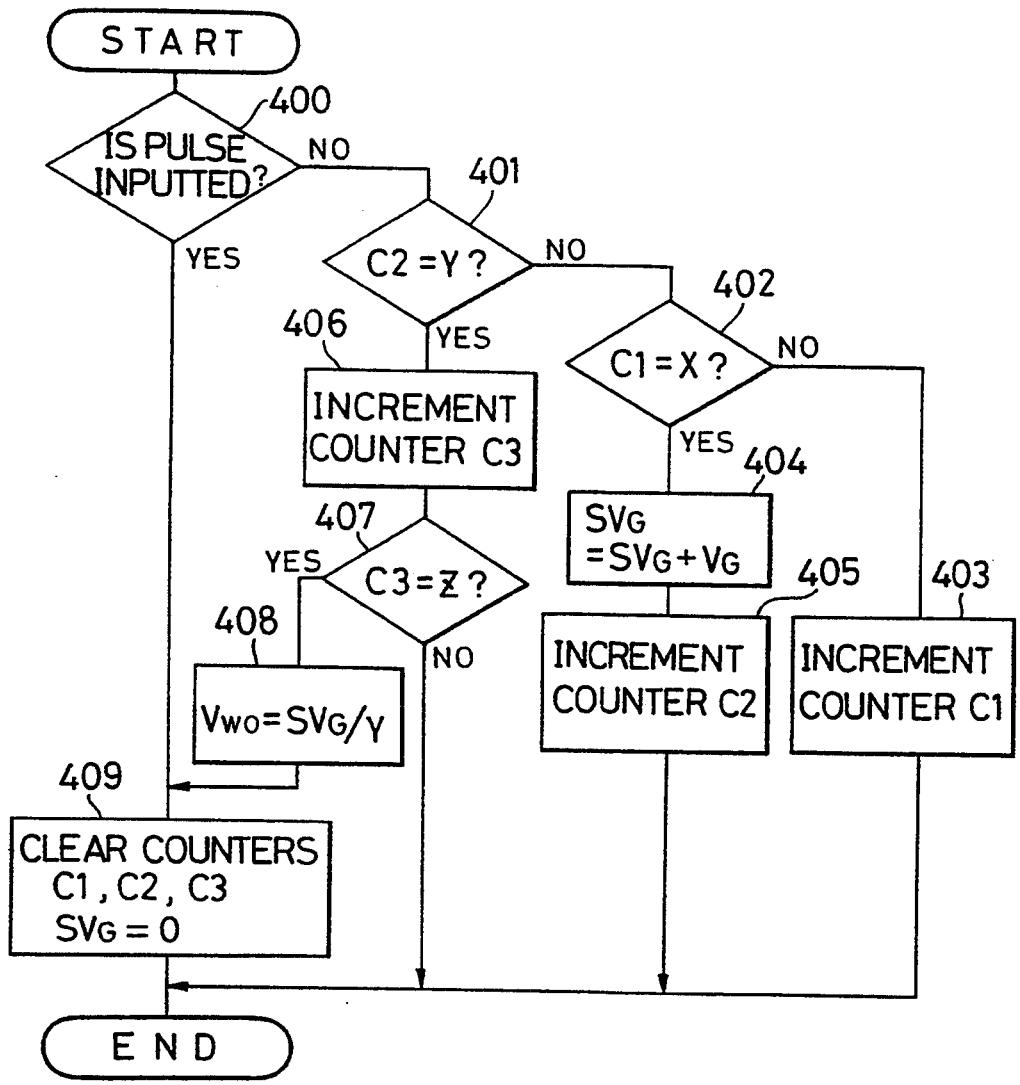
Figure 11:
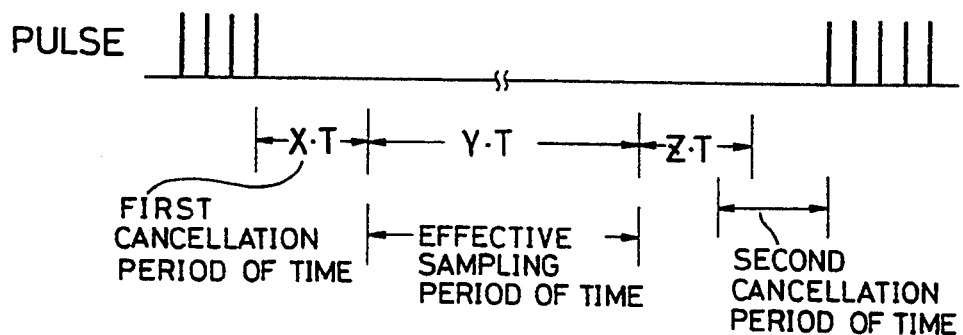
FIG. 11 is a time chart that shows a sampling in the program of FIG. 10.

FIG. 10 shows a further embodiment of the reference voltage reset program. In this program, sampling is effected only during the predetermined sampling interval, and all unnecessarily wasteful samplings can be eliminated. More specifically, it is first decided whether or not the pulse from travel sensor 4 has been entered (Step 400). If the result of Step 400 is "NO", it is decided whether or not a second counter C2 has reached Y (Step 401). If the result of Step 401 is "NO", it is decided whether or not a first counter C1 has reached X (Step 402). If the result of Step 402 is "NO", the first counter C1 is incremented (Step 403), and the program ends. Therefore Steps 400, 401, 402, and 403 are executed repeatedly until the end of the first cancellation interval X*T after the pulse from travel sensor 4 stops.

Immediately after the end of the first cancellation interval X*T, the result of Step 402 becomes "YES", and Steps 404 and 405 are executed. In Step 404 the output voltage $V_G$ is added to an additional value $SV_G$ calculated in the previous iteration to increment additional value $SV_G$. Second counter C2 is incremented in Step 405. Thus sampling output voltage $V_G$ and adding the samples are effected during the predetermined interval Y*T after the end of first cancellation interval X*T.

Immediately after the end of predetermined interval Y*T, the result of Step 401 becomes "YES", and the program proceeds to Step 406. In Step 406 a third counter C3 is incremented. Then it is decided whether or not the third counter C3 has reached Z (Step 407). If the result is "NO", the program ends. Therefore Steps 400, 401, 406, and 407 are executed repeatedly until the end of second cancellation interval Z*T.

Immediately after the end of second cancellation interval Z*T, the result of Step 407 becomes "YES", and the program proceeds to Step 408. In Step 408 additional value $SV_G$ is divided by Y to obtain the average value of output voltage $V_G$, and the reference voltage $V_{WO}$ is reset to that value. Then counters C1, C2, and C3 are all cleared, and additional value $SV_G$ is reset to zero (Step 409).

When the pulse from travel sensor 4 resumes during the predetermined interval Y*T, Step 409 is executed, cancelling any additional value $SV_G$ resulting from previous iterations. As a result, reference voltage $V_{WO}$ is not reset. Similarly, when the pulse from travel sensor 4 resumes during second cancellation interval Z*T, after the end of predetermined interval Y*T, Step 409 is also executed and reference voltage $V_{WO}$ not reset.

The present invention is not limited to the above embodiments, and various modifications can be made. For example, the navigation system of the present invention may further comprise an apparatus for receiving a radio wave from an artificial satellite, as a means for detecting a current position of the vehicle.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A navigation system which comprises:
an angular velocity sensor for generating an output voltage corresponding to an angular velocity of a vehicle;
means for storing a reference voltage that corresponds to a value of zero for said angular velocity;
means for calculating a corrected angular velocity of said vehicle from both said reference voltage and said output voltage;
means for resetting said reference voltage;
a travel sensor for communicating a pulse whenever said vehicle runs a predetermined distance;
means for applying said pulse to said means for resetting;
said means for resetting employing, as an effective sampling interval, at least a part of an interval from an end of a predetermined first cancellation interval after said pulse has stopped until a start of a second cancellation interval prior to a resumption of said pulse;
said means for resetting including means for calculating an average value of said output voltage from a plurality of samples thereof taken periodically during said effective sampling interval;
said means for resetting including means for setting said reference voltage equal to said average value; and
said means for resetting employing, as said effective sampling interval, a one of:
(1) a whole interval from the termination of said first cancellation interval until the start of said second cancellation interval;
(2) a predetermined interval following said first cancellation interval; and
(3) a predetermined interval preceding said second cancellation interval;

means for locating said vehicle; and means for applying said reference voltage to said means for locating.

2. A navigation system according to claim 1, wherein said means for resetting employs, as said effective sampling interval, said whole interval from the termination of said first cancellation interval until the start of said second cancellation interval.

3. A navigation system according to claim 1, wherein said means for resetting employs, as said effective sampling interval, said predetermined interval following said first cancellation interval.

4. A navigation system according to claim 1, wherein said means for resetting employs, as said effective sampling interval, said predetermined interval preceding said second cancellation interval.

5. A navigation system according to claim 1, wherein said means for resetting resets said reference voltage, when said pulse is resumed, if said interval from said end of said first cancellation interval until said start of said second cancellation interval is one of equal to and longer than a predetermined interval.

6. A navigation system according to claim 5, wherein said means for resetting samples said output voltage during an interval from immediately after said pulse stops until immediately before said pulse resumes and resets said reference voltage to an average of said output voltage sampled during said effective sampling interval.

7. A navigation system according to claim 5, wherein said means for resetting samples said output voltage during an interval from immediately after said first cancellation interval until immediately before said pulse resumes and resets said reference voltage to an average of said output voltage sampled during said effective sampling interval.

8. A navigation system according to claim 1, wherein said means for resetting employs a predetermined interval immediately after said first cancellation interval as an effective sampling interval, samples said output voltage during said effective sampling interval, and thereafter resets said reference voltage to an average of said output voltage sampled under a condition that an interval equal to said second cancellation interval has elapsed while said pulse is stopped.

9. A navigation system which comprises:

an angular velocity sensor for generating an output voltage corresponding to an angular velocity of a vehicle;

means for storing a reference voltage that corresponds to a value of zero for said angular velocity;

a correction circuit for calculating a corrected angular velocity of said vehicle from both said reference voltage and said output voltage;

a reference voltage resetting circuit for resetting said reference voltage;

a travel sensor for communicating a pulse whenever said vehicle runs a predetermined distance;

means for applying said pulse to said reference voltage resetting circuit;

said reference voltage resetting circuit employing, as an effective sampling interval, at least a part of an interval from an end of a predetermined first cancellation interval after said pulse has stopped until a start of a second cancellation interval prior to a resumption of said pulse;

said reference voltage resetting circuit calculating an average value of said output voltage from a plurality of samples thereof taken periodically during said effective sampling interval;

said reference voltage resetting circuit including means for setting said reference voltage equal to said average value;

said reference voltage resetting circuit employing, as said effective sampling interval, a one of:

(1) a whole interval from the termination of said first cancellation interval until the start of said second cancellation interval;

(2) a predetermined interval following said first cancellation interval; and (3) a predetermined interval preceding said second cancellation interval;

means for locating said vehicle; and means for applying said reference voltage to said means for locating.

10. A navigation system according to claim 9, wherein said means for resetting employs, as said effective sampling interval, said whole interval from the termination of said first cancellation interval until the start of said second cancellation interval.

11. A navigation system according to claim 9, wherein said reference voltage resetting circuit employs, as said effective sampling interval, said predetermined interval following said first cancellation interval.

12. A navigation system according to claim 9, wherein said reference voltage resetting circuit employs, as said effective sampling interval, said predetermined interval preceding said second cancellation interval.

13. A navigation system according to claim 9, wherein said reference voltage resetting circuit resets said reference voltage, when said pulse is resumed, if said interval from said end of said first cancellation interval until said start of said second cancellation interval is one of equal to and longer than a predetermined interval.

14. A navigation system according to claim 13, wherein said reference voltage resetting circuit samples said output voltage during an interval from immediately after said pulse stops until immediately before said pulse resumes and resets said reference voltage to an average of said output voltage sampled during said effective sampling interval.

15. A navigation system according to claim 13, wherein said reference voltage resetting circuit samples said output voltage during an interval from immediately after said first cancellation interval until immediately before said pulse resumes and resets said reference voltage to an average of said output voltage sampled during said effective sampling interval.

16. A navigation system according to claim 9, wherein said reference voltage resetting circuit employs a predetermined interval immediately after said first cancellation interval as an effective sampling interval, samples said output voltage during said effective sampling interval, and thereafter resets said reference voltage to an average of said output voltage sampled under a condition that an interval equal to said second cancellation interval has elapsed while said pulse is stopped.

* * * * *